July 21, 1931. A. F. MASURY 1,815,442
SHOCK INSULATED MOUNTING FOR AIRCRAFT ENGINES AND RADIAL MOTORS IN BUSSES
Filed Jan. 2, 1930 2 Sheets-Sheet 1
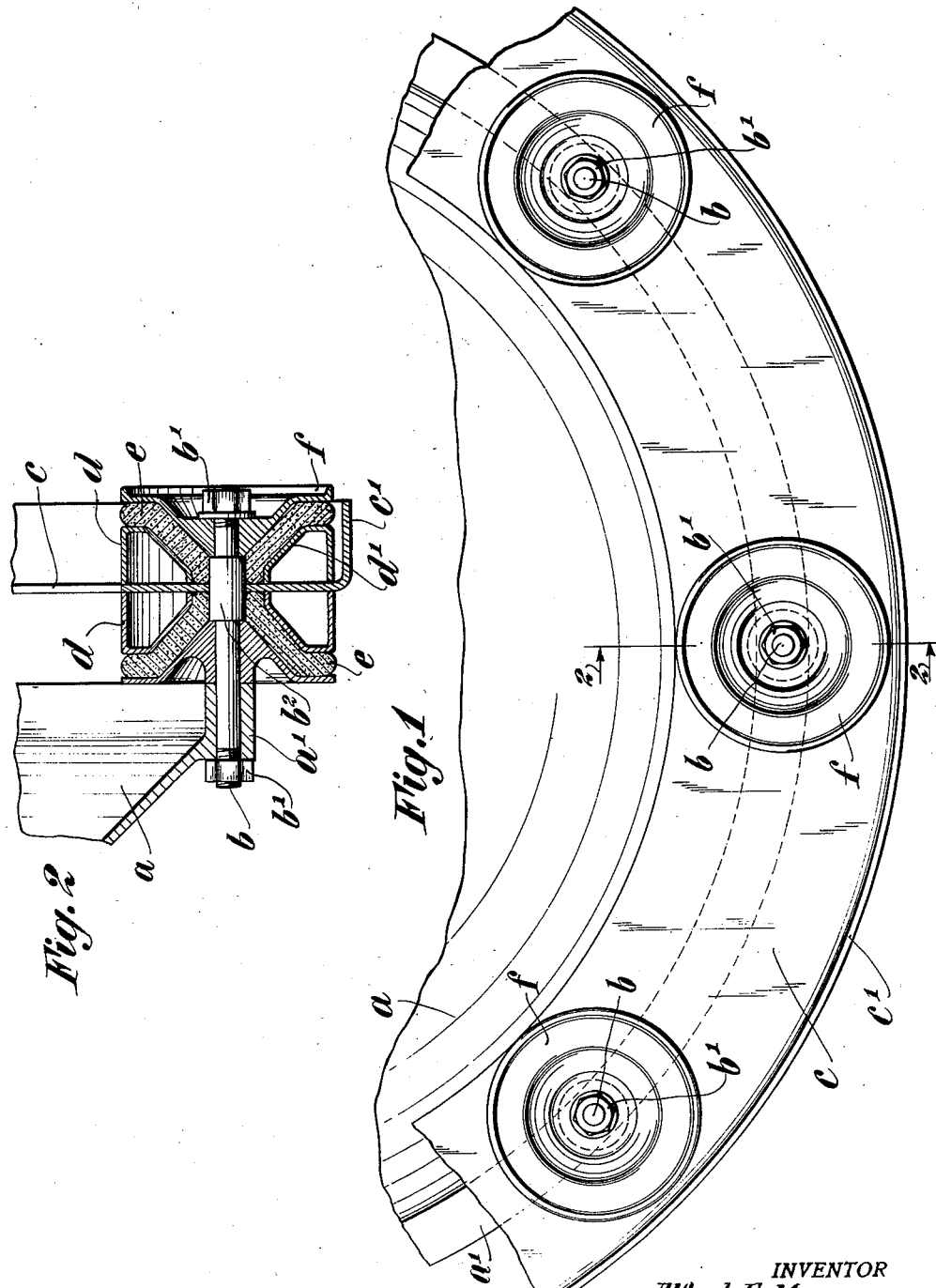
INVENTOR
Alfred F. Masury,
BY Redding, Greeley, O'Shea + Campbell
HIS ATTORNEYS

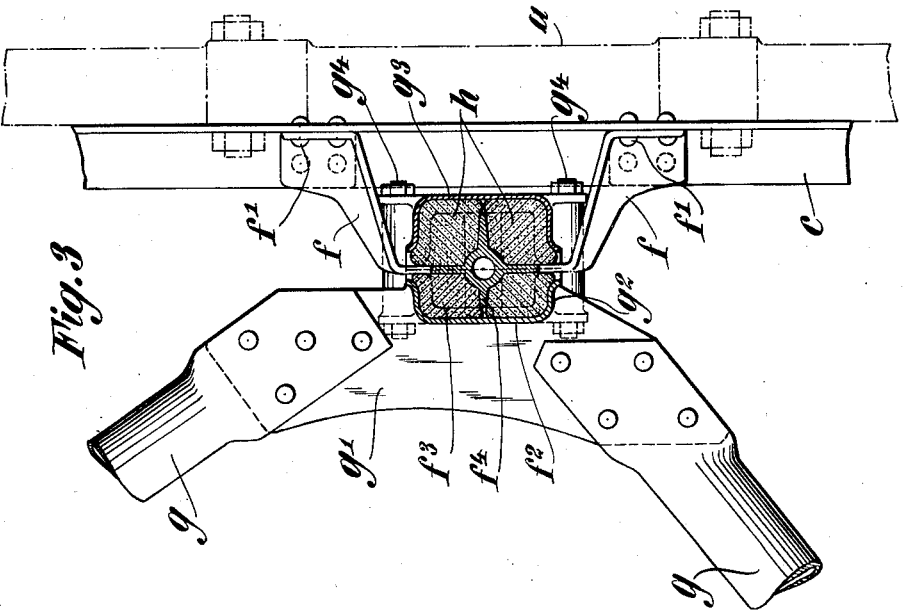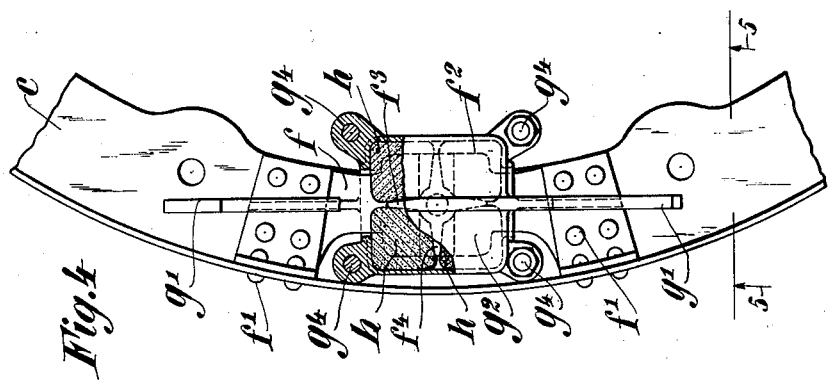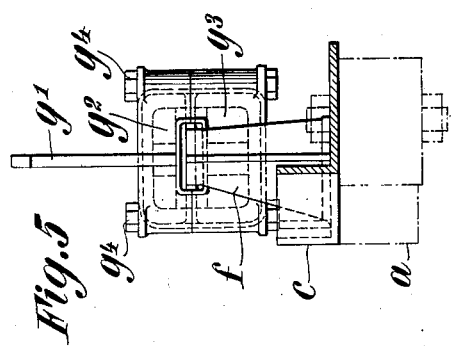

Patented July 21, 1931

1,815,442

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

SHOCK INSULATED MOUNTING FOR AIRCRAFT ENGINES AND RADIAL MOTORS IN BUSSES

Application filed January 2, 1930. Serial No. 418,041.

The present invention relates to mountings for power units and embodies, more specifically, an improved shock insulated mounting for aircraft engines, such mounting effectively deadening the vibrations set up in the engine and preventing their transmission to the fuselage and frame of the craft.

The desirability of cushioning the above noted stresses is well known since such stresses and vibrations are extremely objectionable to the operators and passengers of aircraft, and the present invention contemplates the provision of a mounting which improves the riding qualities and operation of aircraft, thus materially increasing the comfort of passengers, as well as crew.

An object of the invention, accordingly, is to provide a mounting for aircraft engines in which a cushioning means is incorporated to deaden the vibrations of the engine which are impressed upon the frame.

A further object of the invention is to provide a mounting of the above character which is characterized by great strength and effective cushioning, at the same time being simple of construction and readily applied and dismounted to facilitate the inspection and replacement of engines and associated elements.

Further objects, not specifically enumerated above, will be apparent as the invention is described in greater detail in connection with the accompanying drawings, wherein:

Figure 1 is a segmental view in end elevation, showing one form of mounting constructed in accordance with the present invention.

Figure 2 is a view in section, taken on line 2—2 of Figure 1, and looking in the direction of the arrows.

Figure 3 is a segmental view in side elevation, partly in section, and showing a modified mounting means constructed in accordance with the present invention.

Figure 4 is a view in end elevation, partly broken away and in section, showing the mounting of Figure 3.

Figure 5 is a view in section, taken on line 5—5 of Figure 4, and looking in the direction of the arrows.

Referring particularly to Figures 1 and 2, the crank case of an aircraft engine is indicated at $a$ being formed with spaced mounting bosses $a'$ through which securing bolts $b$ extend. A mounting ring $c$, formed with a peripheral flange $c'$ is carried upon suitable longerons in a well known fashion, annular seats $d$ being carried upon opposite sides of the mounting ring as clearly shown in Figure 2. These seats are formed of cup-shaped portions $d'$ within which annular, generally conical-shaped yielding non-metallic cushioning elements $e$ are received. Cooperating cups $f$ are carried by the bolt $b$ and spaced thereon to engage the respective blocks of yielding non-metallic material $e$. The degree of compression set up in the blocks may be varied by taking up on the nuts $b'$ of the bolt $b$ and a sleeve $b^2$ is preferably mounted over the bolt to seat the adjacent portions of the blocks of yielding non-metallic material $e$. In this manner chafing of the blocks by relative movement of the bolt $b$ with respect thereto is eliminated and a more effective mounting provided.

In the foregoing construction, the blocks of yielding non-metallic material, such as rubber, are mounted between the crank case and the mounting ring.

Referring to the construction shown in Figures 3, 4, and 5, the crank case is again indicated at $a$ and is mounted directly on the mounting ring $c$. Spaced brackets $f$ are secured to the mounting ring as at $f'$. These brackets are generally U-shaped as viewed from the left in Figure 3 with the arms thereof diverging toward the ring $c$. Centrally of the brackets, widened seat portions $f^2$ are formed in the planes thereof, additional seat portions $f^3$ being formed on the brackets adjacent the portions and perpendicular thereto as clearly seen in Figures 3 and 4. Similar seat portions $f^4$ are formed on the brackets and are perpendicular to both the seat portions $f^2$ and $f^3$, thus affording bearing surfaces on the bracket in every direction.

The longérons are shown at $g$ and are secured to plates $g'$ within which housing portions $g^2$ are formed. Cooperating housing portions, such as caps $g^3$, are secured to the respective plates and housing portions $g^2$ by means of bolts $g^4$, the portions $g^2$ and $g^3$ being spaced apart at the top and bottom thereof to receive the corresponding brackets $f$. Within the housing portions, blocks of yielding non-metallic material $h$ are provided, these blocks being mounted within each sector defined by the perpendicular seat portions $f^2$, $f^3$ and $f^4$.

In the above construction, it will be seen that the cushioning means is provided between the mounting ring and longérons as distinguished from the construction shown in Figures 1 and 2, wherein such means is mounted between the engine crank case and the mounting ring.

While the invention has been described with specific reference to the accompanying drawings, it is not to be limited, save as defined in the appended claims.

I claim as my invention:

1. An engine mounting for vehicle engines comprising a mounting ring, conically shaped seats mounted upon opposite sides of the ring and having seating portions parallel and perpendicular to the ring, blocks of yielding non-metallic material mounted in the seats and conforming to the seating portions thereof, conical bearing members carried by the engine and disposed concentrically to the first seats, a sleeve spacing the cups and positioned in the ring, and a bolt passing through the cups and sleeve to maintain the seats in position with the yielding means under compression.

2. An engine mounting for vehicle engines comprising a mounting ring, conically shaped seats mounted upon opposite sides of the ring, blocks of yielding non-metallic material mounted in the seats, conical bearing members carried by the engine and disposed concentrically to the first seats, and means to maintain the bearing members in position with the yielding means under compression.

3. An engine mounting for vehicle engines comprising a mounting ring, a plurality of conically shaped seats mounted upon opposite sides of the ring and spaced about the length thereof, blocks of yielding non-metallic material mounted in the seats, spaced cooperating seats carried by the engine concentrically to the first seats, and means to maintain the last named seats in position with the yielding means under compression.

This specification signed this 30th day of December, A. D. 1929.

ALFRED F. MASURY.